United States Patent
Anderson et al.

(10) Patent No.: US 10,415,552 B2
(45) Date of Patent: Sep. 17, 2019

(54) INJECTION SYSTEM AND METHOD FOR INJECTING A CYLINDRICAL ARRAY OF LIQUID JETS

(71) Applicant: The Boeing Company, Chicago, IL (US)

(72) Inventors: Jeffery S. Anderson, Madison, AL (US); Erin R. Gish, New Market, AL (US)

(73) Assignee: The Boeing Company, Chicago, IL (US)

( * ) Notice: Subject to any disclaimer, the term of this patent is extended or adjusted under 35 U.S.C. 154(b) by 349 days.

(21) Appl. No.: 15/426,952

(22) Filed: Feb. 7, 2017

(65) Prior Publication Data

US 2018/0223815 A1    Aug. 9, 2018

(51) Int. Cl.
| | |
|---|---|
| *B23K 10/00* | (2006.01) |
| *H05H 1/54* | (2006.01) |
| *F03H 1/00* | (2006.01) |
| *F15D 1/08* | (2006.01) |
| *H05H 1/06* | (2006.01) |
| *B64G 1/40* | (2006.01) |

(52) U.S. Cl.
CPC ......... *F03H 1/0081* (2013.01); *F03H 1/0012* (2013.01); *F15D 1/08* (2013.01); *H05H 1/06* (2013.01); *H05H 1/54* (2013.01); *B64G 1/408* (2013.01)

(58) Field of Classification Search
CPC ........ F15D 1/08; F03H 1/0081; F03H 1/0012; B64G 1/408; H05H 1/06; H05H 1/54

USPC ............. 219/121.36, 121.5, 121.51, 121.48, 219/121.52

See application file for complete search history.

(56) References Cited

U.S. PATENT DOCUMENTS

| | | | |
|---|---|---|---|
| 4,269,658 A | 5/1981 | Ohkawa | |
| 2005/0257515 A1 | 11/2005 | Song | |
| 2007/0255237 A1* | 11/2007 | Lobl | ................. A61M 5/14276 604/288.01 |
| 2010/0237048 A1* | 9/2010 | Brothier | .................. F23G 5/085 219/121.5 |
| 2011/0173983 A1* | 7/2011 | Pinson | ...................... F23R 3/14 60/742 |

(Continued)

FOREIGN PATENT DOCUMENTS

WO    9013910    11/1990

OTHER PUBLICATIONS

Beg, "Pulsed Power Driven Z-Pinches," dated Jul. 30, 2009.

(Continued)

*Primary Examiner* — Mark H Paschall

(57) ABSTRACT

An injection system includes a reservoir for containing liquid, and a gating plate having a circular array of gating plate apertures. The injection system additionally includes a faceplate positioned adjacent to the gating plate and having a circular array of faceplate orifices. The injection system also has a motor to rotate the gating plate, and a controller to control the motor for rotating the gating plate into an aligned clocking orientation in which the gating plate apertures and the faceplate orifices are aligned to initiate the formation of a cylindrical array of liquid jets, and rotate the gating plate into a non-aligned clocking orientation terminate formation of the liquid jets after a predetermined discrete quantity of the liquid is injected.

21 Claims, 12 Drawing Sheets

(56) References Cited

U.S. PATENT DOCUMENTS

2017/0055552 A1* 3/2017 Giardino .............. B01F 5/0476

OTHER PUBLICATIONS

Cassibry, "The Case and Development Path for Fusion Propulsion", Journal of Spacecraft and Rockets, vol. 52, No. 2 (2015), Mar.-Apr. 2015.
Cassibry, "Progress in Fusion Propulsion Research at the University of Alabama in Huntsville," dated Feb. 28, 2016.
Miernik, "Fusion Propulsion Z-Pinch Engine Concept," 5th Spacecraft Joint Subcommittee Meeting of the Joint Army Navy NASA Air Force (JANNAF), Dec. 5, 2011.
Marshall Space Flight Center, "Z-Pinch Pulsed Plasma Propulsion Technology Development," dated Oct. 8, 2010.
Polsgrove, "Design of Z-pinch and Dense Plasma Focus Powered Vehicles," 49th AIAA Aerospace Sciences Meeting including the New Horizons Forum and Aerospace Exposition, Jan. 4-7, 2011, Orlando, Florida.
EPO, European Search Report, Appl. No. EP 17203037, dated Feb. 7, 2018.

* cited by examiner

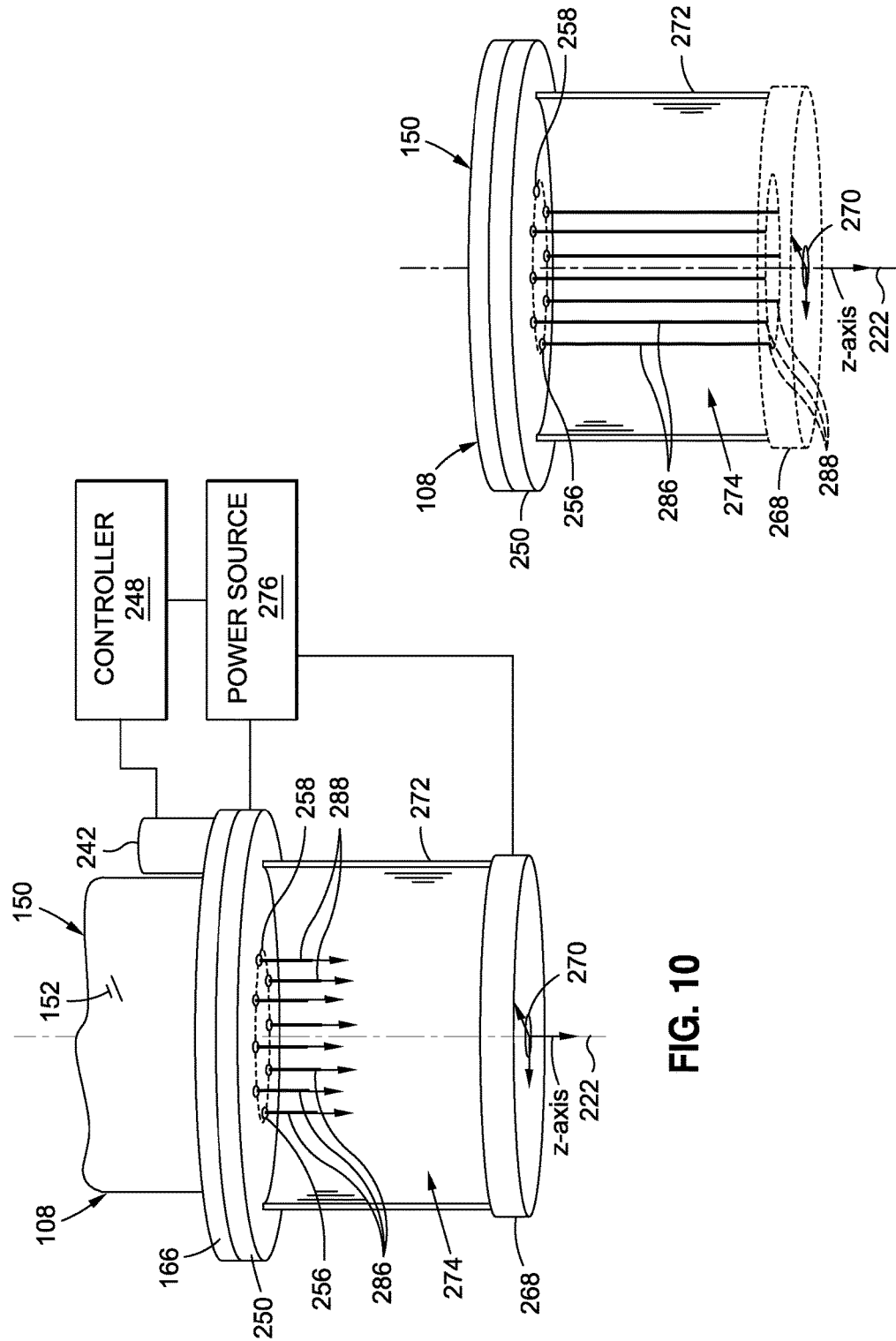

INJECTION SYSTEM AND METHOD FOR INJECTING A CYLINDRICAL ARRAY OF LIQUID JETS

FIELD

The present disclosure relates generally to liquid injectors and, more particularly, to an injector system and method for repeatably injecting liquid in discrete quantities to repeatably form a cylindrical array of liquid jets capable of conducting electric current.

BACKGROUND

Fusion propulsion has the potential to enable interplanetary space travel on a time scale that is practical for humans. One approach to fusion propulsion is the z-pinch plasma method in which a high-magnitude electric current pulse is passed through an electrically-conductive column of material extending between an anode and a cathode of a z-pinch device. Over a relatively short time period (e.g., $10^{-6}$ sec), the electric current heats the material into a high-temperature plasma and generates a magnetic flux that interacts with the electric current, resulting in a Lorentz force that radially compresses the plasma to a very high density. The high-temperature plasma may be expanded in a nozzle and expelled to generate propulsive thrust for a vehicle.

One z-pinch method uses an array of fine metallic wires as the electrically-conductive material through which electric current pulse is passed. Unfortunately, each time a z-pinch reaction is performed, the wires are destroyed. Setting up a new z-pinch reaction using metallic wires is a time-consuming process. Furthermore, z-pinch reactions using metallic wires cannot be applied to a pulsed fusion propulsion system which requires repeatedly introducing new columns of electrically-conductive material between the anode and the cathode, and applying a pulse of electric current to each new column.

As can be seen, there exists a need in the art for a system and method for repeatedly generating electrically-conductive paths to which electric current may be applied in a z-pinch device.

SUMMARY

The above-noted needs associated with generating electrically-conductive paths for z-pinch reactions are specifically addressed and alleviated by the present disclosure which provides an injection system for generating a cylindrical array of discrete liquid jets. The injection system includes a reservoir for containing liquid, and a gating plate having a circular array of gating plate apertures. The injection system additionally includes a faceplate positioned adjacent to the gating plate and having a circular array of faceplate orifices. The injection system also has a motor to rotate the gating plate, and a controller to control the motor for rotating the gating plate into an aligned clocking orientation in which the gating plate apertures and the faceplate orifices are aligned to initiate injection of a cylindrical array of liquid jets into an injection area, and rotate the gating plate into a non-aligned clocking orientation to terminate formation of the liquid jets after a discrete quantity of the liquid is injected.

Also disclosed is the implementation of an injection system in a z-pinch device. The injection system for the z-pinch device has the above-described reservoir, rotatable gating plate, faceplate, motor, and controller. The controller is configured to control the motor to rotate the gating plate into the aligned clocking orientation to initiate injection of a cylindrical array of liquid jets toward a cathode plate. In addition, the controller is configured to control the motor to rotate the gating plate into the non-aligned clocking orientation to terminate formation of the liquid jets after free ends of the liquid jets contact the cathode plate. The z-pinch device has a power source configured to apply a pulse of electric current to the faceplate upon the termination of the formation of the liquid jets. The electric current heats the liquid jets into a plasma and generates a magnetic flux that interacts with the electric current resulting in a Lorentz force that radially compresses the plasma into a high-density, high-temperature pinched plasma cylinder along the central axis.

In addition, disclosed is a method of injecting a cylindrical array of liquid jets such as for a z-pinch reaction in a z-pinch device. The method includes rotating, using a motor commanded by a controller, a gating plate into an aligned clocking orientation in which a circular array of gating plate apertures are aligned with a circular array of faceplate orifices of a faceplate fixedly located adjacent the gating plate. The method additionally includes passing liquid under pressure in a reservoir through the gating plate apertures and faceplate orifices to form a cylindrical array of liquid jets directed toward a cathode located in spaced relation to the faceplate. The method also includes rotating, using the motor commanded by the controller, the gating plate into a non-aligned clocking orientation when free ends of the liquid jets contact the cathode plate. Furthermore, the method includes terminating formation of the liquid jets in response to rotating the gating plate into the non-aligned clocking orientation.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 10 is a partially cutaway perspective view of a portion of an injection system showing the initiation of the injection of a cylindrical array of liquid jets during from a faceplate toward a cathode plate;

FIG. 11 is a perspective view of the injection system of FIG. 10 showing the cylindrical array of liquid jets at the instant where the free ends of the liquid jets come into contact with the cathode plate;

DETAILED DESCRIPTION

Figure 1:
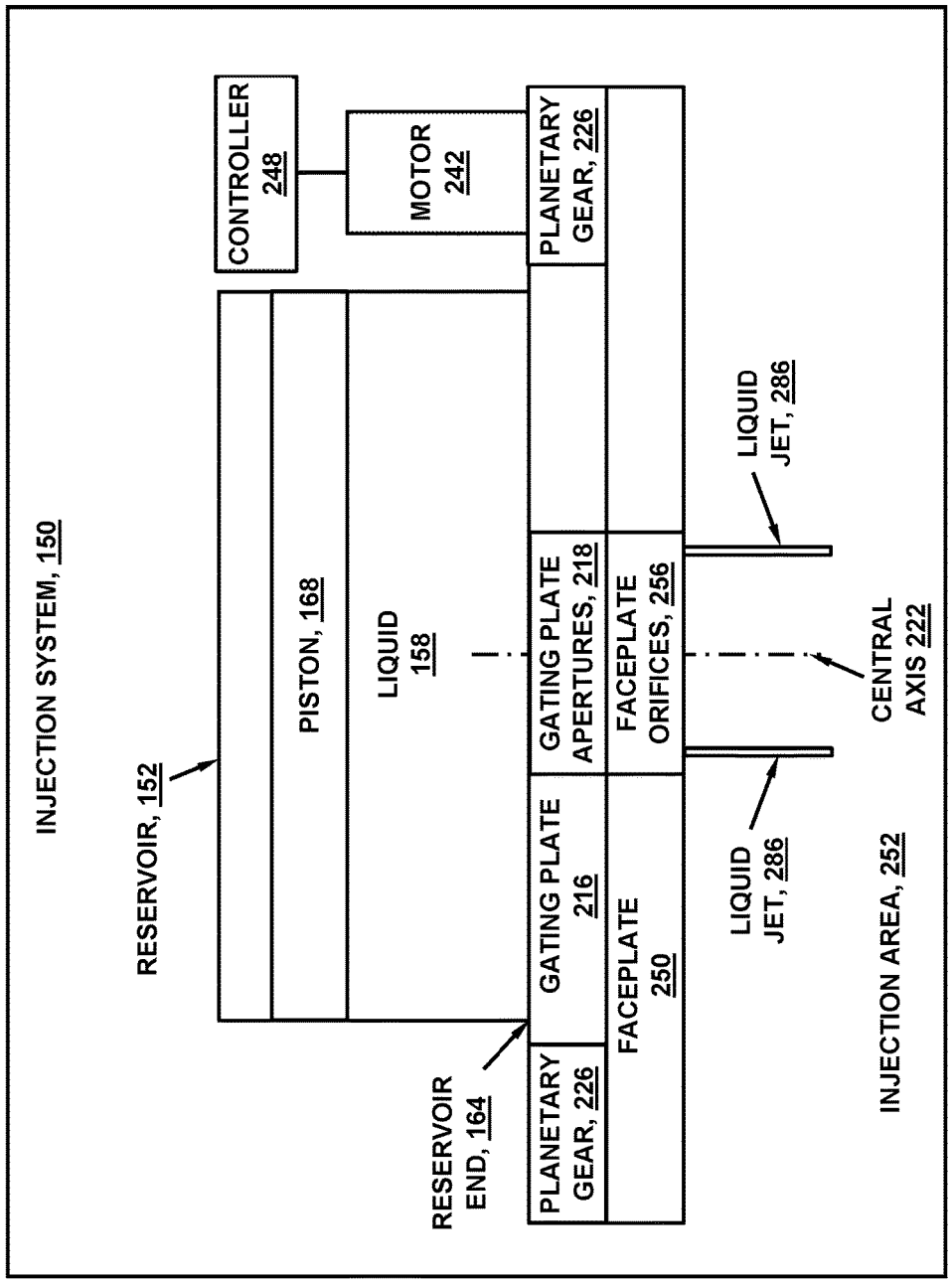
FIG. 1 is a block diagram of an example of the presently-disclosed injection system for injecting a cylindrical array of liquid jets.

Referring now to the drawings wherein the showings are for purposes of illustrating preferred and various embodiments of the disclosure, shown in FIG. 1 is an example of an injection system 150 as disclosed herein for injecting a cylindrical array of liquid jets 286 into an injection area 252. The injection system 150 includes a reservoir 152 for containing liquid 158 such as molten metal. The reservoir may include a piston 168 for applying pressure to the liquid 158. In addition, the injection system 150 includes a motor 242 for rotating a gating plate 216 located at a reservoir end 164. The injection system 150 may include planetary gears 226 for keeping the gating plate 216 centered on a central axis 222 during rotation. The gating plate includes a circular array of gating plate apertures 218 and is rotated by the motor 242 under command of a controller 248 to selectively allow the liquid 158 from the reservoir 152 to pass from the gating plate apertures 218 and into a circular array 258 of faceplate orifices 256 formed in a faceplate 250 coupled to the reservoir 152.

As discussed below, the injection system 150 passes relatively small quantities of liquid 158 through the circular array 258 of faceplate orifices 256 to form a cylindrical array of coherent liquid jets 286. In this regard, the motor 242 rotates the gating plate 216 into an aligned clocking orientation 264 (FIG. 7) to initiate the flow of liquid 158 through the faceplate orifices 256 to generate the liquid jets 286. Notably, the rotatable gating plate 216 rotates the gating plate 216 into a non-aligned clocking orientation 266 (FIG. 8) to terminate the formation of the liquid jets 286 in a precise manner such that only a discrete quantity of liquid 158 is injected into an injection area 252 of a given application such as in a z-pinch device 108 (e.g., FIGS. 3-4). For example, the injection system 150 may be implemented for injecting a cylindrical array of discrete liquid jets 286 into a fusion chamber 274 (FIGS. 3-4) of a z-pinch engine 110 (FIGS. 3-4) in which the liquid jets 286 may undergo a z-pinch fusion reaction. Advantageously, the presently-disclosed injection system 150 provides a means for terminating the liquid jets 286 after a discrete quantity of liquid 158 is injected to prevent fusion reaction quenching which would otherwise occur if liquid 158 were injected after the start of the z-pinch reaction.

Although described in the context of a z-pinch engine 110, the presently-disclosed injection system 150 may be implemented in any one of a variety of devices or applications including, but not limited to, producing nanoparticles (e.g., particles less than 100 nm in width) for use in various products, generating electric power, performing inertial confinement fusion experiments to optimize energy output, and other applications. Advantageously, the presently-disclosed injection system 150 significantly reduces the turnaround time for performing successive z-pinch reaction experiments conventionally performed using metallic wires. In addition, the injection system 150 avoids the use of multiple individual injectors (not shown) such as nozzles, combustion injectors, and dispensing injectors that would otherwise require coordinated operation to simultaneously initiate and terminate for forming multiple coherent liquid jets 286 in a precise manner. Furthermore, the presently-disclosed injection system 150 enables the repeatable injection of liquid jets 286 at any one a variety of different frequencies. In this regard, the injection system 150 enables repeatable z-pinch reactions as may be required in a pulsed fusion propulsion system such as the z-pinch engine 110 shown in FIGS. 2-3.

Figure 2:
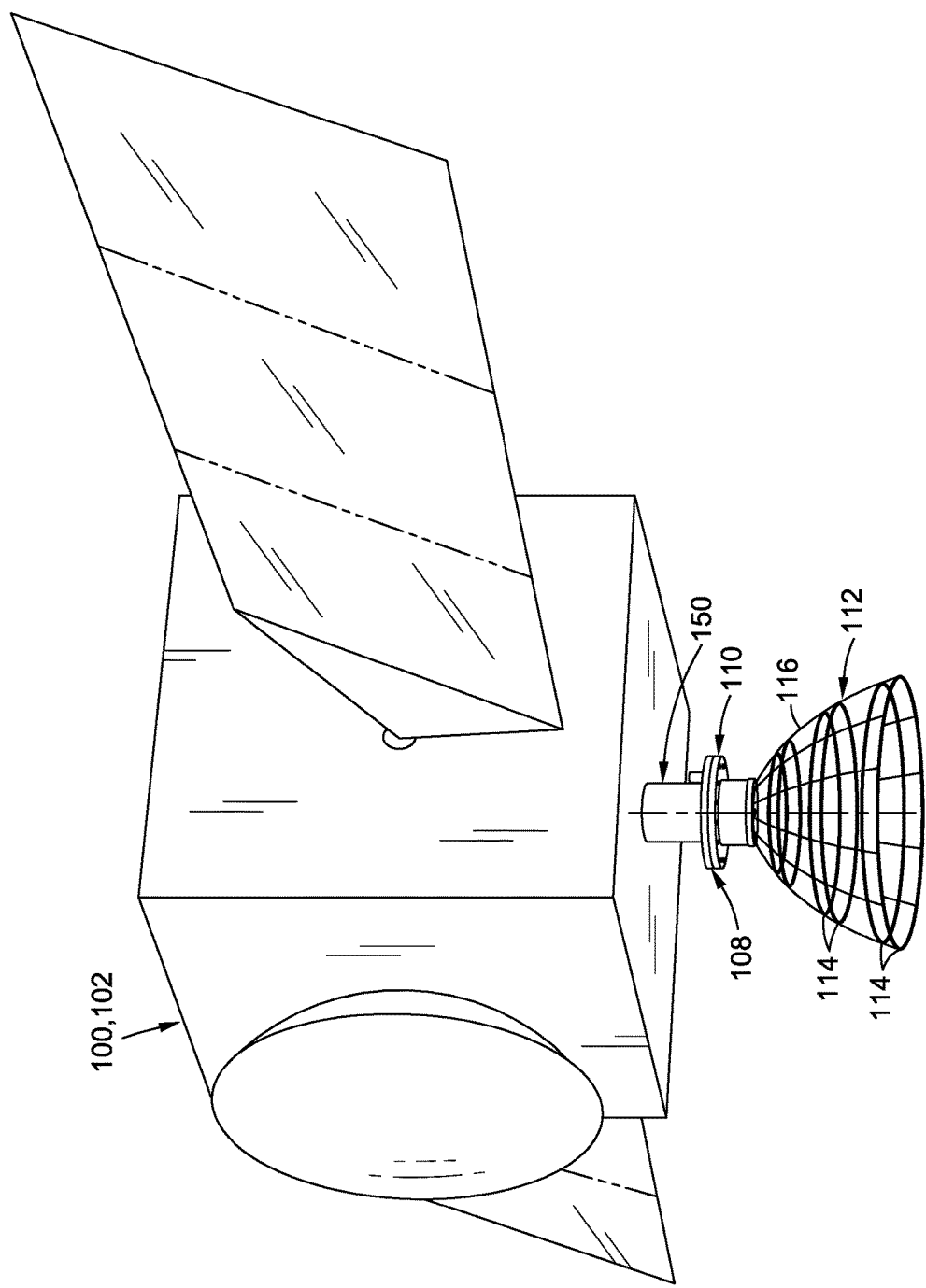
FIG. 2 is a perspective view of an example of a spacecraft having a z-pinch engine incorporating an example of the presently-disclosed injection system.
Figure 16:
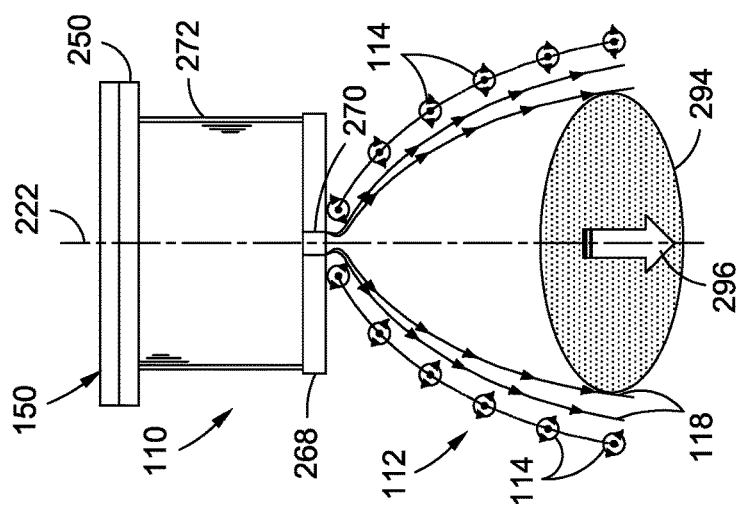
FIG. 16 is a side view of a z-pinch engine showing the expulsion of the expanding plasma from the magnetic nozzle resulting in the generation of propulsive thrust.

Referring briefly to FIG. 2, shown is an example of the presently-disclosed injection system 150 implemented in a z-pinch engine 110 of a spacecraft 102 such as an unmanned space probe for space exploration. The injection system 150 may include an electrical power source 276 (FIG. 1) for periodically applying high-magnitude electric current 278 pulses (FIG. 12) to the z-pinch engine 110 for generating propulsive thrust 296 (FIG. 16). For example, for a spacecraft 102 of relatively small mass, the power source 276 may apply an electric current 278 pulse to the z-pinch engine 110 every several hours (e.g., every eight hours) to initiate a z-pinch reaction on a cylindrical array of liquid jets 286 for generating a pulse of propulsive thrust 296 (FIG. 16) to the spacecraft 102, after which the solar panels (not shown) may recharge the power source 276 in preparation for the next pulse of electric current 278 to be applied to a new cylindrical array of liquid jets 286, as described below. As mentioned above, the presently-disclosed injection system 150 may be implemented in any one of a variety of devices or applications, and is not limited to a z-pinch engine 110 of a spacecraft.

Figure 3:
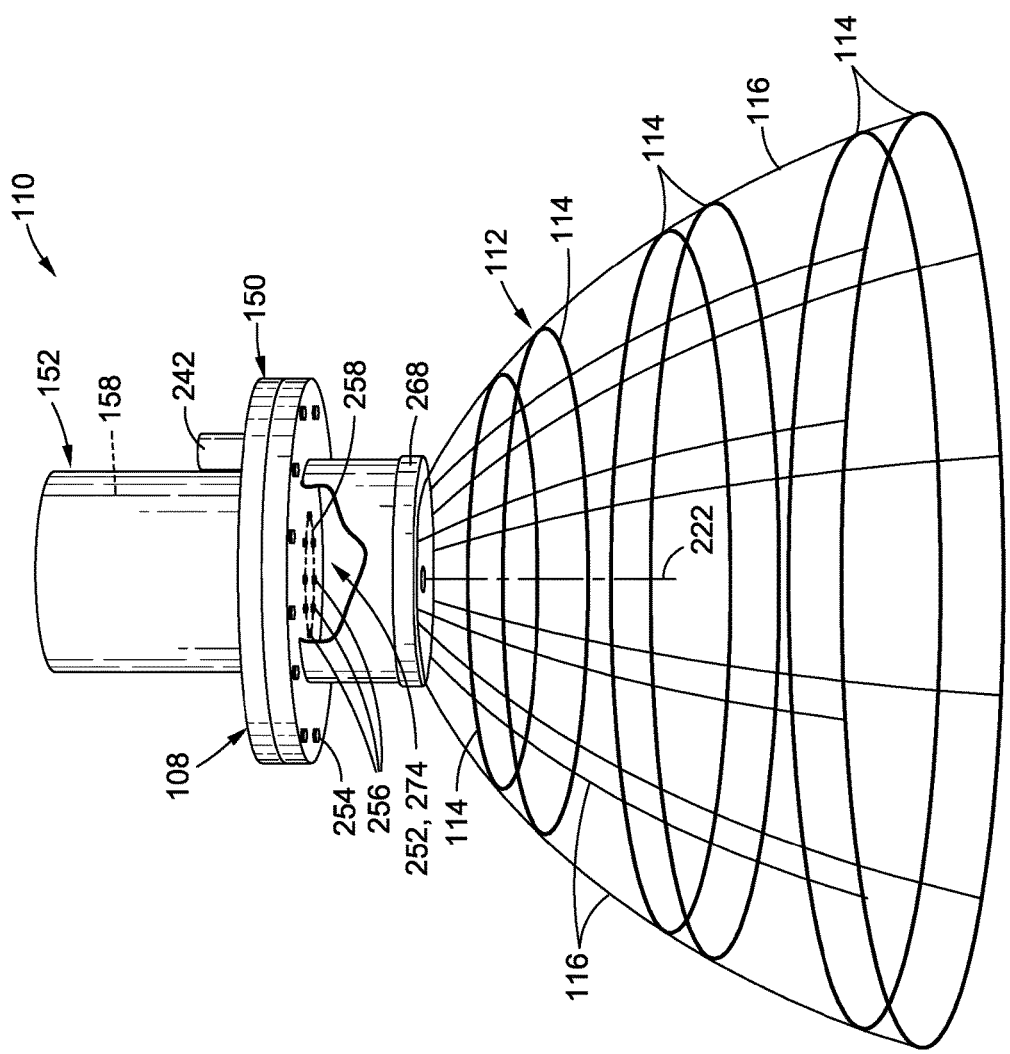
FIG. 3 is a perspective view of the injection system incorporated into the z-pinch engine of FIG. 2.
Figure 4:
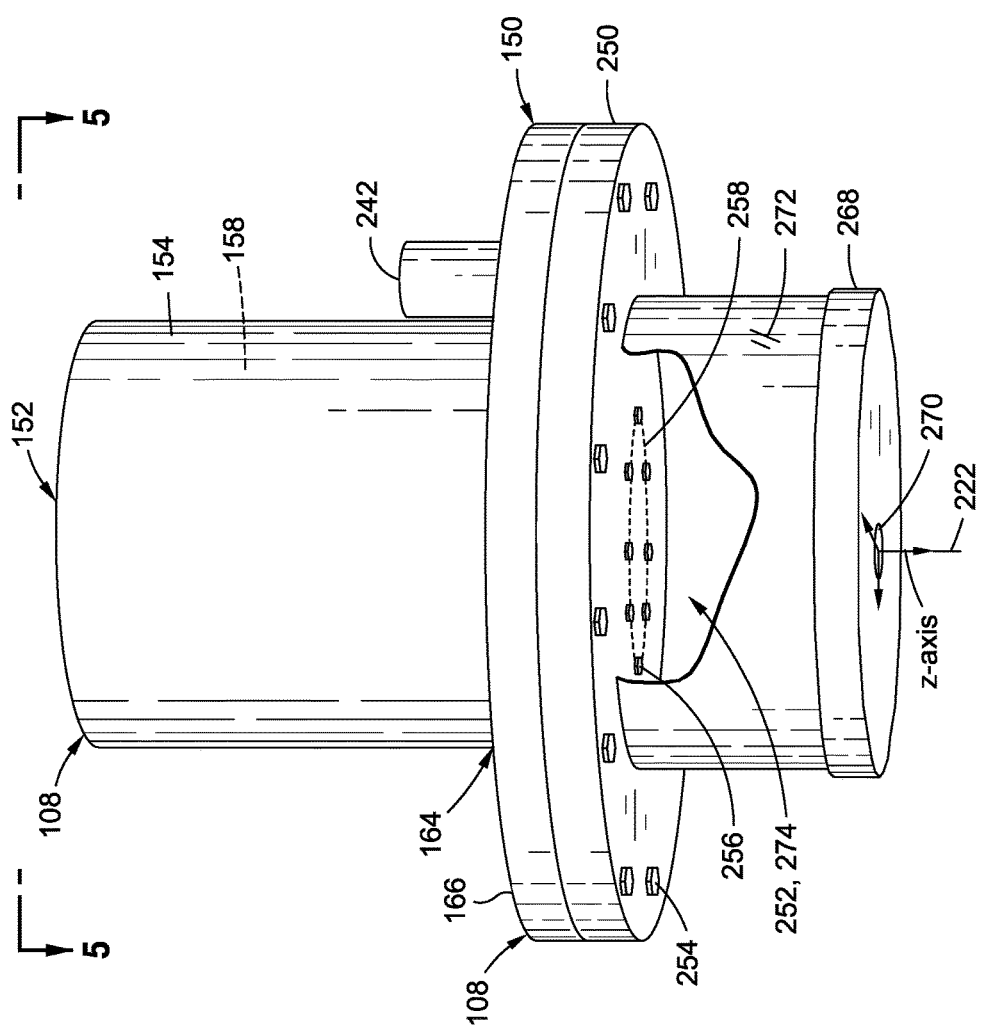
FIG. 4 is a perspective view of the injection system.
Figure 5:
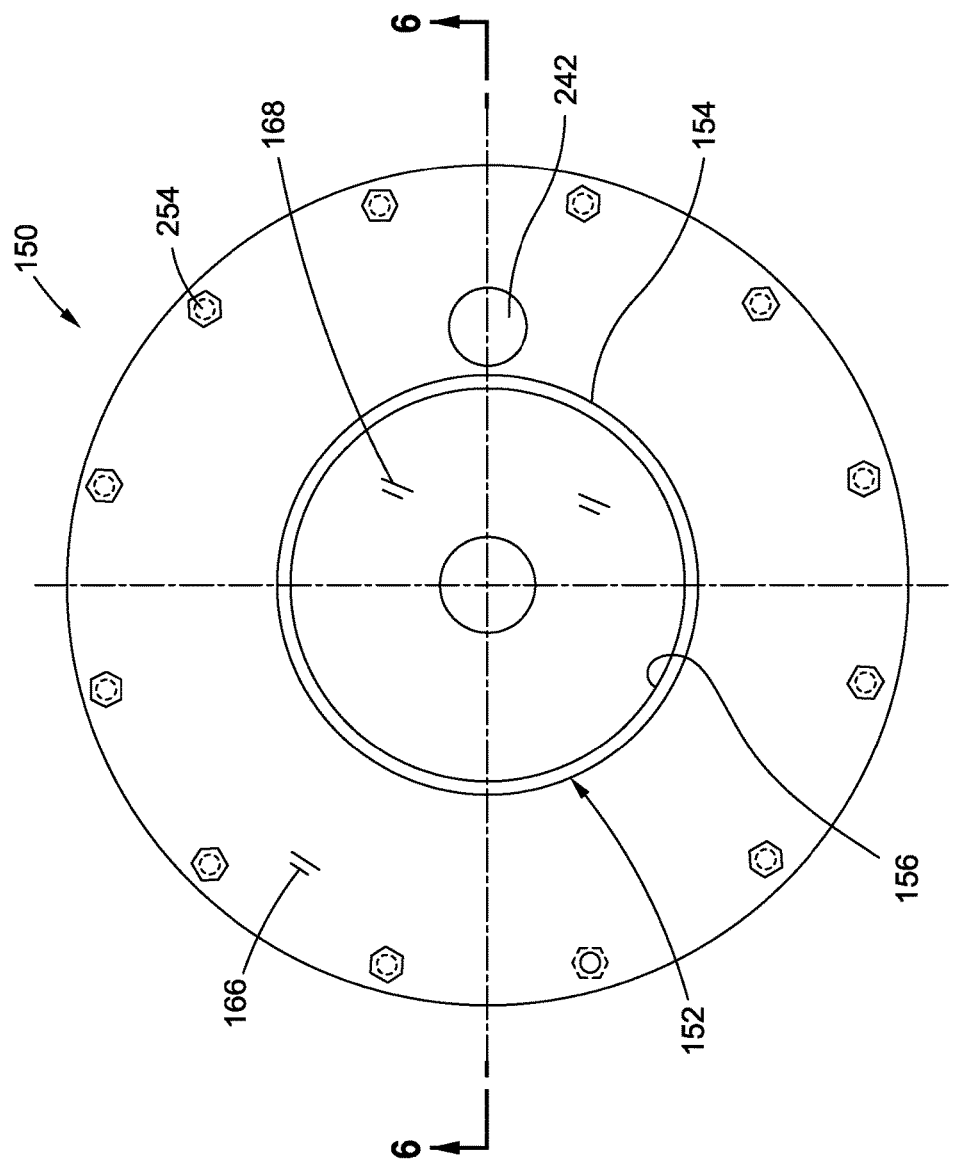
FIG. 5 is a top view of the injection system of FIG. 4.

FIG. 3 is a perspective view of the injection system 150 implemented in a z-pinch engine 110 having a magnetic nozzle 112 coupled to the aft end of the z-pinch engine 110. In the example shown, a cathode plate 268 is located in spaced relation to the faceplate 250. However, the injection system 150 may be implemented in a non-engine z-pinch device that does not include a cathode plate 268. In FIG. 3, the cathode plate 268 is located in spaced relation to the faceplate 250 by means of an enclosure element 272. However, the enclosure element 272 may be omitted, and the cathode plate 268 may be held in position by other means such as a shroud (not shown) or another cathode-supporting element (not shown) that may be included with the z-pinch engine 110. In the example shown, the enclosure element 272 may enclose a fusion chamber 274 into which the liquid jets 286 are injected. The enclosure element 272 may be formed of electrically non-conductive material and/or the enclosure element 272 may mounted in a manner such that the cathode plate 268 is electrically isolated from the faceplate 250, allowing the electric current 278 (FIG. 12) pulse applied to the faceplate 250 by the power source 276 (FIG.

Figure 13:
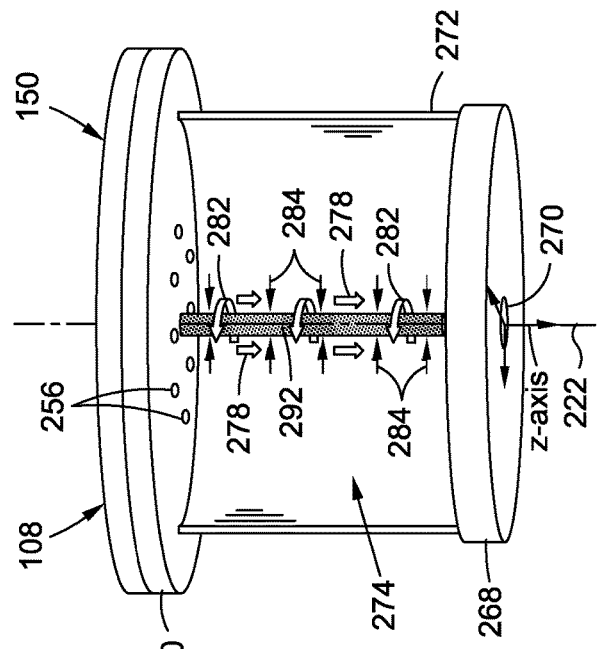
FIG. 13 is a perspective view of the injection system showing a magnetic flux generated by the electric current pulse and resulting in a Lorentz force that radially compresses the plasma into a high-temperature plasma cylinder.

6) flows through the liquid jets 286 (FIG. 12) and back to the power source 276 via the return path 280 illustrated in FIG. 13.

As illustrated in FIGS. 10-13 and described in greater detail below, the injection system 150 may be implemented in a device in which a high-magnitude electric current 278 pulse is applied to the faceplate 250 once the flow of liquid jets 286 out of the faceplate orifices 256 is terminated by the gating plate 216. In one embodiment, the gating plate 216 may be operated in a manner to terminate the liquid jets 286 after the passage of a predetermined amount of time from initiation of the liquid jets 286. In another embodiment illustrated in FIGS. 10-11, the gating plate 216 may be operated in a manner to terminate the liquid jets 286 after the free ends 288 of the liquid jets 286 make contact with the cathode plate 268.

Regardless of the manner in which the liquid jets 286 are terminated, the electric current 278 travels through the liquid jets 286 from the faceplate 250 (e.g., the anode) to the cathode plate 268 and heats the liquid jets 286 into a plasma 290 while simultaneously generating a magnetic flux 282 that interacts with the electric current 278, resulting in a Lorentz force 284 that confines the plasma 290 and radially compresses or pinches the plasma 290. The radial compression or implosion of the plasma 290 causes a fusion reaction in which individual pairs of nuclei join or fuse together to form different nuclei, releasing heat and energy. In this regard, the radially imploding plasma 290 becomes a high-temperature, high-density pinched plasma 292 cylinder comprised of fused atoms and extending generally along the central axis 222. The pinched plasma 292 resulting from the fusion reaction is unstable and has a tendency to expand. The confinement of the pinched plasma 292 by the Lorentz force 284 causes the pinched plasma 292 to be ejected out of the fusion chamber 274 through the central opening 270 in the cathode plate 268 and into the magnetic nozzle 112 wherein the pinched plasma 292 expands into expanding plasma 294.

Figure 14:
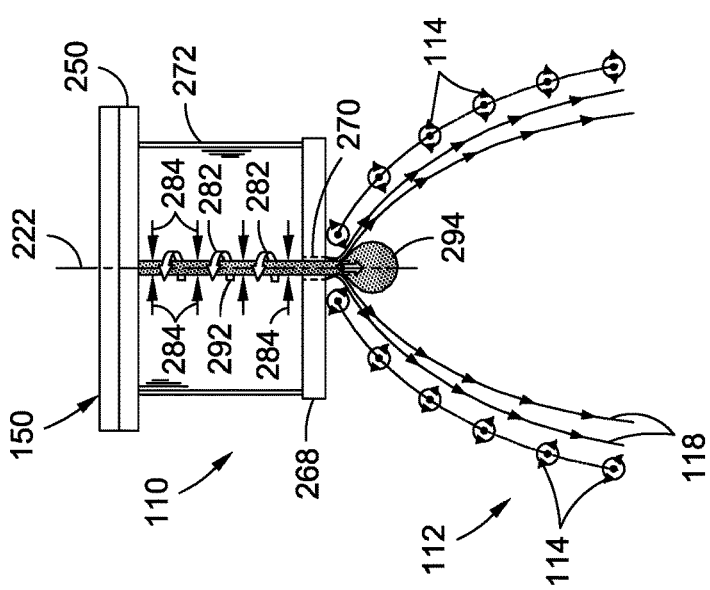
FIG. 14 is a side view of a z-pinch engine showing the plasma entering a magnetic nozzle via a central opening in the cathode plate.
Figure 15:
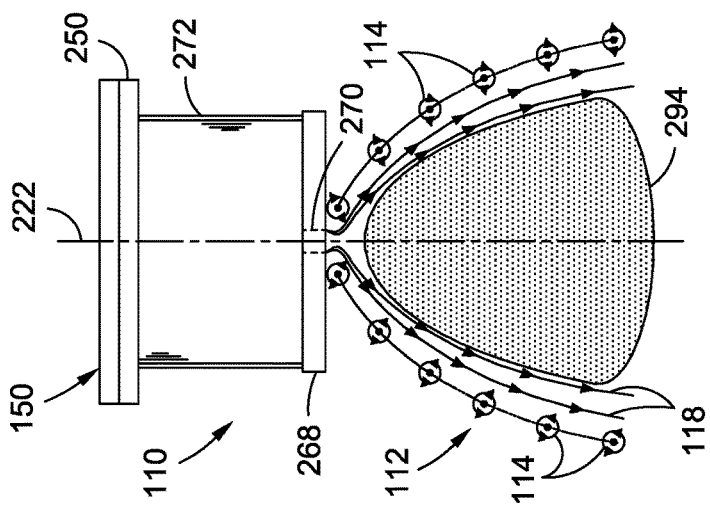
FIG. 15 is a side view of a z-pinch engine showing the expansion of the plasma in the magnetic nozzle.

Referring still to FIG. 3, the magnetic nozzle 112 includes a plurality of nozzle rings 114 arranged in a parabolic shape when the magnetic nozzle 112 is viewed in cross section. The nozzle rings 114 are supported by a plurality of nozzle splines 116. Each nozzle ring 114 may include a central superconducting coil (not shown) enveloped by a tubular thrust coil (not shown). As illustrated in FIGS. 14-16 and described in greater detail below, electric current flowing in the superconducting coils causes the nozzle rings 114 to collectively generate magnetic field lines 118 (FIG. 14) inside the magnetic nozzle 112. As described in greater detail below, the magnetic field lines 118 prevent the high-temperature expanding plasma 294 from contacting and damaging the nozzle rings 114, and thereby allow the expanding plasma 294 to expand (FIG. 15) and be expelled (FIG. 16) from the magnetic nozzle 112, resulting in thrust 296 such as for propelling a vehicle 100. In this regard, fusion propulsion in the present disclosure may be described as a sequence of (1) a fusion reaction producing pinched plasma 292 in the fusion chamber followed by (2) a propulsive thrust 296 generated by the expansion and expulsion of the expanding plasma 294 from the magnetic nozzle 112.

Figure 6:
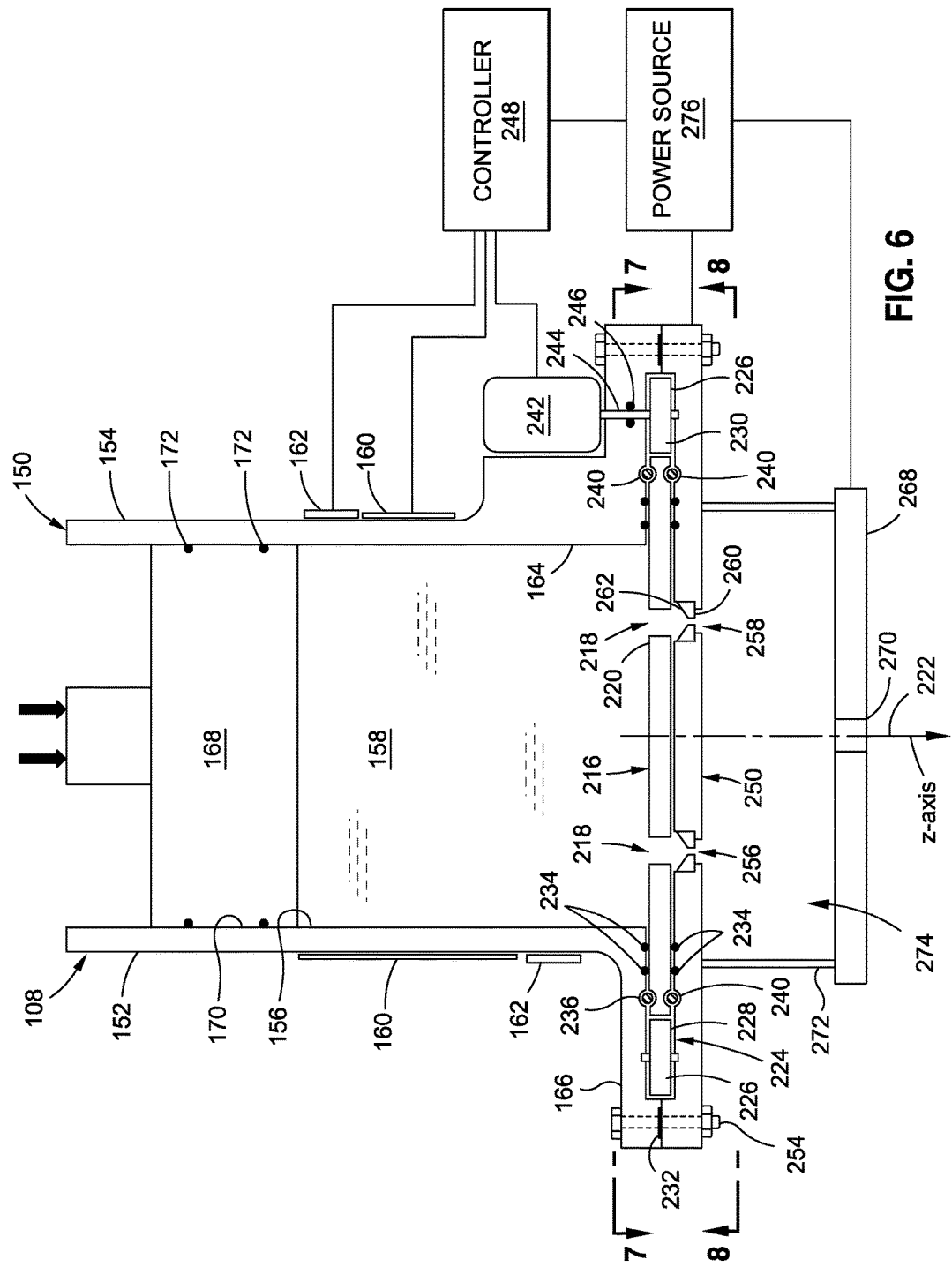
FIG. 6 is a vertical section view of the injection system of FIG. 5.
Figure 7:
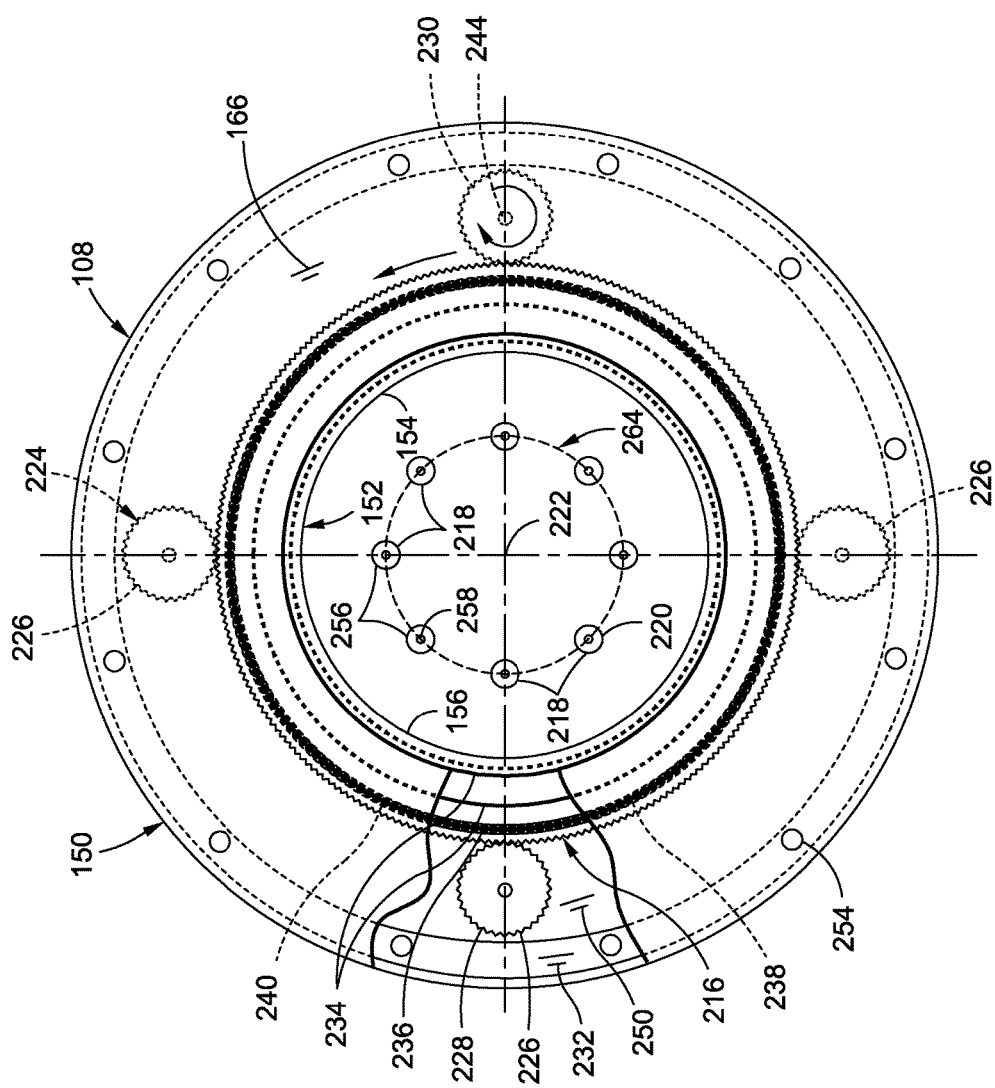
FIG. 7 is a partially cutaway top section view of the injection system taken along line 7 of FIG. 6.

FIGS. 6-7 show the reservoir 152 having a reservoir base flange 166 located at the reservoir end 164. The reservoir base flange 166 extends laterally outwardly from the reservoir 152 sidewall, and may have a thickness in the range of approximately 0.10-1.0 inch, although the reservoir may be provided in any size, shape or configuration required for a given implementation of the injection system 150. When implemented in the example of a z-pinch device 108, a cathode plate 268 may be mounted in spaced relation to the faceplate 250. The enclosure element 272, the faceplate 250, and the cathode plate 268 may collectively form a fusion chamber 274 (FIG. 6) into which the cylindrical array of liquid jets 286 (FIG. 1) are injected. FIG. 6 is a vertical section view of the injection system 150 implemented in a z-pinch device 108. Shown is the reservoir 152 which has a reservoir sidewall 154 for containing an electrically conductive liquid 158. The liquid 158 may be provided in any one of a variety of compositions including, but not limited to, water, deuterium, lithium, gallium, indium, bismuth, lead, copper, aluminum, and/or mercury, or any composition that is electrically-conductive. In the example shown, the reservoir sidewall 154 may have a thickness in the range of approximately 0.10-1.0 inch or larger. The reservoir sidewall 154 may be lined with a reservoir lining 156 comprising a polymer material configured to prevent reaction between the reservoir sidewall 154 and the contents of the reservoir 152.

In some examples, the liquid 158 may be molten metal of a material preferably having a relatively low melting point, such as a melting point of less than 800 degrees F. In this regard, the reservoir 152 may include a reservoir heater 160 mounted to the reservoir 152 such as on an exterior and/or interior of the reservoir sidewall 154. The reservoir heater 160 may be communicatively coupled to the controller 248 and regulated by the controller 248 for controlling the temperature of the molten metal. In some examples, the reservoir heater 160 may be a resistive heating element, such as a Kapton™ strip heater applied to the reservoir sidewall 154, a resistance wire coiled around the reservoir sidewall 154, or other heater configurations including any type of conductive heater, convective heater or radiative heater for heating the contents of the reservoir 152.

Referring still to FIG. 6, the injection system 150 may include one or more temperature detectors 162 mounted to the reservoir 152 and communicatively coupled to the controller 248 to allow the controller 248 to continuously monitor the temperature of the reservoir sidewall 154 and/or the contents (e.g., the molten metal) of the reservoir 152. In some examples, one or more of the temperature detectors 162 may be provided as a thermocouple mounted between the reservoir heater 160 and the exterior of the reservoir sidewall 154. In other examples, the temperature detectors 162 may be resistance temperature detectors, thermistors, or other contact or non-contact temperature detectors, including sensor ports (not shown) in the reservoir sidewall to allow for direct sensing of the temperature of the contents of the reservoir 152. The controller 248 may continuously receive temperature data from the temperature detectors 162 to allow the controller 248 to adjust the heat output of the reservoir heater 160 in a manner maintaining the contents of the reservoir 152 in a liquid or molten state.

Although shown as having a cylindrical shape, the reservoir 152 and the piston 168 may be provided in any one a variety of cross-sectional shapes. As indicated above, the piston 168 may be slidably mounted in the reservoir 152 for applying pressure to the liquid 158. Pressure may be applied to the piston 168 using a spring (not shown), hydraulic pressure, pneumatic pressure, or by electro-mechanical actuators. As shown in FIG. 6, the piston 168 may include one or more piston seals 172 extending around a circumference of the piston side surface 170 to seal the piston 168 to the reservoir sidewall 154. In one example, a piston seal 212 may be configured as an O-ring seal formed of a high-temperature-resistant material.

Referring to FIGS. 6-7, the injection system 150 includes the rotatable gating plate 216 which is located proximate the reservoir end 164. The gating plate 216 may be provided as a generally planar disk having a thickness in the range of approximately 0.10-1.0 inch, although the dimensions of the gating plate 216 or any other component of the injection system may be larger or smaller than the disclosed ranges. The gating plate 216 may be in direct contact with the liquid 158 in the reservoir 152. The gating plate 216 has a symmetric circular array 220 of gating plate apertures 218, and is rotatable about a central axis 222 passing through a center of the gating plate 216 circular array 220.

The injection system 150 may include a pair of gating plate bearings 236 mounted on opposite sides of the gating plate 216 for rotatably supporting the gating plate 216 between the reservoir base flange 166 and the faceplate 250. The gating plate bearing 236 located between the gating plate 216 and the reservoir base flange 166 may support the gating plate 216 against axial loads exerted by the liquid 158 under pressure. The gating plate bearing 236 located between the gating plate 216 and the faceplate 250 may prevent axial movement of the gating plate 216 away the faceplate 250, such that the gating plate 216 and the faceplate 250 may be maintained in sealed contact with each other. In an embodiment, each gating plate bearing 236 may include an array of bearing elements 238 such as ball bearings or tapered roller bearings captured within opposing circular grooves 240 formed in the surfaces of the gating plate 216, the reservoir base flange 166, and the faceplate 250. However, the gating plate bearings may be provided in any one of a variety of configurations, and is not limited by the embodiments described above and illustrated in the figures.

The circular array 220 of gating plate apertures 218 may have a diameter in the range of approximately 0.5-8 inches, and more preferably in the range of approximately 1-3 inches, although the circular array 220 of gating plate apertures 218 may be provided in a diameter smaller than 0.5 inch or larger than 8 inches. In the example shown, the circular array 220 includes eight (8) gating plate apertures 218. However, the gating plate 216 may be provided with any number of gating plate apertures 218 arranged in a circular array 220. For example, a gating plate 216 may include 4-12 gating plate apertures 218. In other examples, a gating plate 216 may include more than 12 gating plate apertures 218. The quantity of gating plate apertures 218 may be dependent upon the desired circumferential spacing between the gating plate apertures 218, among other factors. Although shown in FIG. 7 as being circular in shape, individual gating plate apertures 218 may be provided in any one a variety of shapes including a square, a rectangle, a triangle, a slot, or any other shape that facilitates the passage of liquid 158 through the gating plate apertures 218 and into the faceplate orifices 256.

Referring still to FIGS. 6-7, the injection system 150 includes the above-mentioned faceplate 250 which may be provided in a thickness of approximately 0.1-1.0 inch although the faceplate 250 may be provided in any size, shape or configuration depending upon the specific implementation of the injection system 150. The faceplate 250 may be non-rotatably coupled to the reservoir base flange 166 by a plurality of mechanical fasteners 254 circumferentially-spaced around the perimeter of the reservoir base flange 166 and faceplate 250. The faceplate 250 may be sealed to the reservoir base flange 166 by means of a circumferential gasket 232 to prevent contaminants of the environment from passing between the reservoir base flange 166 and the faceplate 250. The gating plate 216 and/or the reservoir 152 may be electrically insulated from the faceplate 250 in order that the electric current 278 pulse applied to the faceplate 250 by the power source 276 passes into the liquid jets 286.

As shown in FIG. 6, the faceplate 250 is located immediately axially adjacent to the gating plate 216 and has a symmetric circular array 258 of faceplate orifices 256 arranged complementary to the circular array 220 of gating plate apertures 218. In this regard, the faceplate 250 may have the same quantity of faceplate orifices 256 at the same angular spacing and same array diameter as the gating plate apertures 218, as shown in FIG. 6. The individual gating plate apertures 218 may be substantially the same diameter as the individual faceplate orifices 256. However, the individual gating plate apertures 218 may be provided in a larger width or diameter than the faceplate orifices 256 to facilitate unrestricted flow of liquid 158 through the gating plate apertures 218 and into the faceplate orifices 256 when the gating plate 216 is in the aligned clocking orientation 264 shown in FIG. 7.

Each one of the faceplate orifices 256 may have an opening width (e.g., the final width or diameter at the exit end of the orifice) of less than approximately 100 microns to produce a liquid jet 286 of corresponding width or diameter. For example, the diameter of individual faceplate orifices 256 may be in the range of proximately 5-100 microns to produce liquid jets 286 having individual diameters of 5-100 microns. In one embodiment, each one of the faceplate orifices 256 may have a final width or diameter in the range of approximately 5-10 microns. The faceplate orifices 256 may each have a circular cross-sectional shape when viewed along an axial direction, although the faceplate orifices 256 may be provided in non-circular cross-sectional shapes. In this regard, the geometry of the faceplate 250 orifice including the axial cross-sectional shape and the longitudinal cross-sectional shape may be optimized in a manner such that the liquid jets 286 exiting the faceplate orifices 256 are coherent streams capable of conducting electric current 278 from the faceplate 250 to the cathode plate 268. The pressure with which the liquid 158 is forced through the faceplate orifices 256, the temperature of the liquid 158, the temperature of the faceplate orifices 256, and the shape and material composition of the faceplate orifices 256 may also have an effect on the coherency of the liquid jets 286.

In the present disclosure, a coherent liquid jet 286 may be described as a stream of liquid that is continuous, unbroken, and generally non-splashing or non-spraying along the length of the liquid jet 286 from the faceplate 250 to the cathode plate 268. A coherent liquid jet 286 may be generally cylindrical along the length, and may preferably maintain substantially (e.g., within 20 percent) the same cross-sectional shape and/or size (e.g., diameter) along the length of the liquid jet 286 from the faceplate to the cathode plate 268. For examples where the injection system 150 is implemented in a z-pinch device 108, consistently forming the liquid jets 286 as coherent streams may allow each electric current 278 pulse to be axisymmetrically or uniformly distributed among the liquid jets 286 in the cylindrical array. Uniformly distributing the electric current 278 pulse among the liquid jets 286 may facilitate uniform heating of the liquid jets 286 into plasma 290 and may promote the radial compression of the plasma 290 by the Lorentz force 284 in a manner such that the plasma 290 is pinched or compressed into a high-density column that is generally centered on the central axis 222.

Referring to FIG. 6, in some examples, the individual faceplate orifices 256 may include a conically-shaped interior 262 that tapers in size along a direction from a receiving end of the faceplate 250 orifice to an exit end of the faceplate 250 orifice. The conically-shaped interior 262 may promote coherency along the length of the liquid jet 286. In still further examples, one or more of the faceplate orifices 256 may include an orifice liner 260 having a conically-shaped interior 262 that tapers in size from the receiving end to the exit end of the orifice liner 260. Orifice liners 260 may be formed of metallic material (e.g., tungsten, steel), ceramic material (e.g., hafnium diboride, zirconium diboride), and/or jewel material (e.g., ruby, sapphire, diamond) in natural or synthetic form. Regardless of the material, each orifice liner 260 may be electrically conductive such that electric current 278 pulse applied to the faceplate 250 may pass through the orifice liner 260 and into the liquid jet 286.

Figure 8:
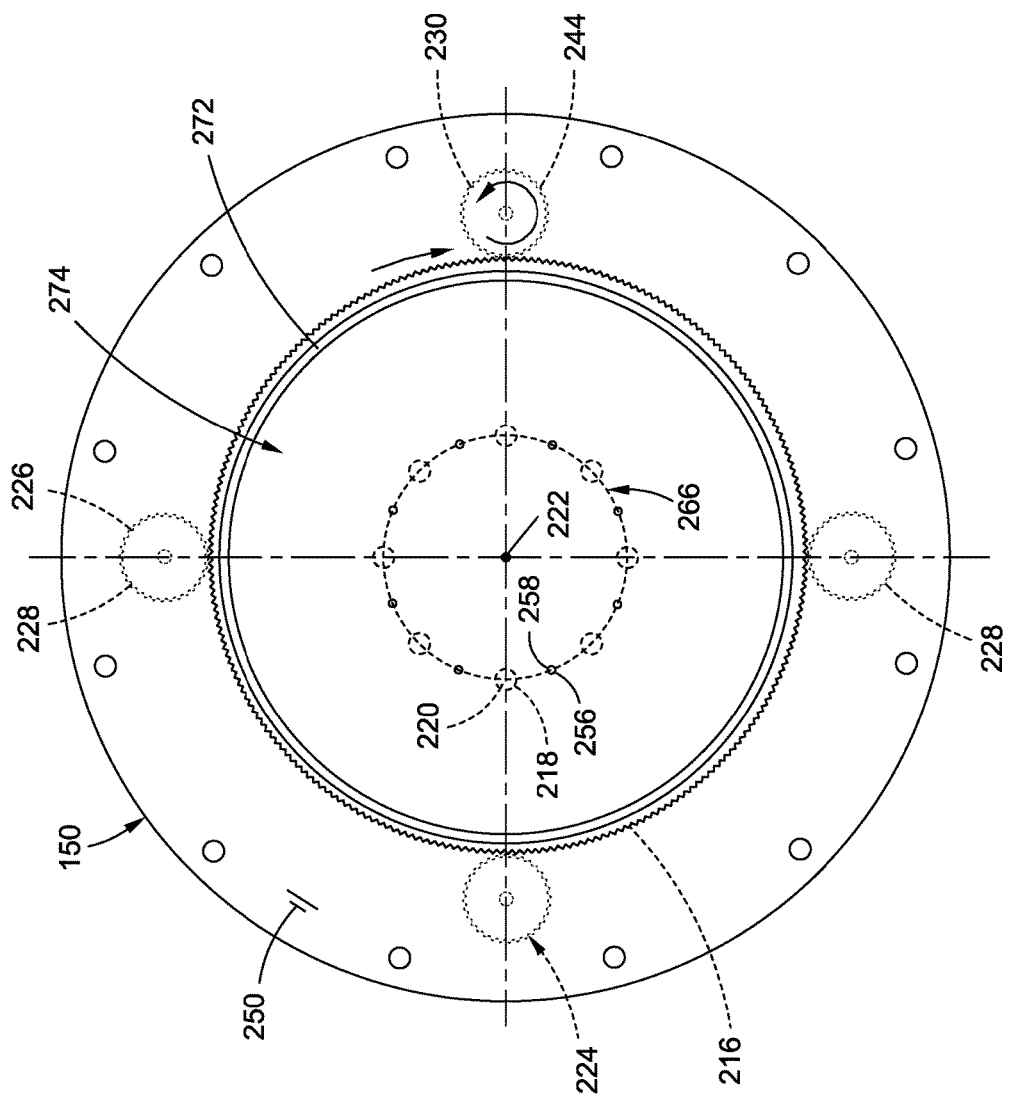
FIG. 8 is a bottom section view of the injection system taken along line 8 of FIG. 6.

The bottom surface of the gating plate 216 may be in direct physical contact with the top surface of the faceplate 250, or the gating plate 216 may be sealed to the faceplate 250 in a manner preventing seepage of liquid 158 between the gating plate 216 and faceplate 250 when the gating plate 216 is in a non-aligned clocking orientation 266 as shown in FIG. 8. In an embodiment, the gating plate 216 may be sealed to the reservoir base flange 166 and to the faceplate 250. For example, as shown in FIGS. 6-7, a pair of circumferential gating plate seals 234, one of larger diameter than the other, may be located radially inboard of the above-described gating plate bearings 236. One pair of circumferential gating plate seals 234 may be located on one side of the gating plate 216 between the gating plate 216 and the reservoir base flange 166, and another pair of circumferential gating plate seals 234 may be located on an opposite side of the gating plate 216 between the gating plate 216 and the faceplate 250. In an embodiment, the gating plate seals 234 may each be configured as O-ring seals preferably formed of a high-temperature-resistant material. The gating plate seals 234 may be seated within circumferential grooves that may be formed in the surfaces of the gating plate 216, the reservoir base flange 166, and/or the faceplate 250.

In an embodiment not shown, the individual gating plate apertures 218 may also be sealed to the surface of the faceplate 250 to prevent liquid 158 from passing through the gating plate apertures 218 and seeping between the facing surfaces of the gating plate 216 and the faceplate 250 and out of the faceplate orifices 256 when the gating plate 216 is in the non-aligned clocking orientation 266 (FIG. 8). Regardless of the configuration of the interface between the facing surfaces of the gating plate 216 and faceplate 250, the gating plate 216 and faceplate 250 are preferably mounted in a manner preventing liquid 158 from passing through the faceplate orifices 256. For examples where the injection system 150 is implemented in a z-pinch device 108, preventing liquid 158 from seeping between the gating plate 216 and the faceplate 250 may facilitate precise control over formation of the liquid jets 286 in discrete quantities.

Referring still to FIGS. 6-7, the injection system 150 may include a planetary gear system 224 for preventing lateral movement of the gating plate 216 and for keeping the gating plate 216 centered on the central axis 222 during rotation. The planetary gear system 224 may include at least three (3) planetary gears 226 angularly spaced at 120 degrees around a perimeter of the gating plate 216. More preferably, the planetary gear system 224 includes four (4) planetary gears 226 angularly spaced at 90 degrees around the perimeter of the gating plate 216. Each one of the planetary gears 226 may be rotatable on spindles (not shown) or bearings supported by or engaged to the reservoir base flange 166 and the faceplate 250. The planetary gears 226 includes at least one drive gear 230 fixedly coupled to a motor shaft 244 extending from the motor 242. The remaining planetary gears 226 may be free-spinning support gears 228. Each one of the planetary gears 226 (e.g., the drive gear 230 and the support gears 228) has gear teeth configured to mesh with the gear teeth formed on the perimeter edge of the gating plate 216.

The motor 242 may be mounted to the reservoir 152 and is configured to rotate the drive gear 230 to cause rotation of the gating plate 216 about the central axis 222 under command of the controller 248. The motor 242 may be an electric motor such as a stepper motor. Alternatively, the motor 242 may be a hydraulically driven device such as a rotary hydraulic actuator (not shown) fluidly coupled to a hydraulic circuit (not shown) which may be included in the injection system 150 for maintaining constant pressure on the piston 168 for maintaining the liquid 158 under pressure. Such a hydraulic circuit may include a pump (not shown) and a relief valve (not shown) to ensure constant pressure on the piston 168. The motor 242 may be reversible, and may include the motor shaft 244 which may extend through the reservoir base flange 166 and terminate at the drive gear 230 of the planetary gear system 224. The motor shaft 244 may be sealed to the reservoir base flange 166 with one or more shaft seals 246 which may be configured as O-rings or other seal configurations.

Referring to FIG. 6, the z-pinch device 108 into which the injection system 150 is shown implemented for exemplary purposes may include the cathode plate 268 which is mounted in spaced relation to the faceplate 250. In the example shown, the cathode plate 268 may be mounted within approximately 1-3 inches of the faceplate 250 and, more preferably, within approximately 2 inches of the faceplate 250. However, the spacing between the cathode plate 268 and the faceplate 250 is implementation specific, such that the cathode plate 268 may be spaced at distances greater than 2 inches from the faceplate 250. The cathode plate 268 functions as an electrode toward which the electric current 278 initially flows when the power source applies the electric current 278 pulse to the faceplate 250. The cathode plate 268 may be provided as a planar disk that is parallel to a generally planar faceplate 250. However, the cathode plate 268 may be provided in any one a variety of different sizes, shapes and configurations. Preferably, the surface of the cathode plate 268 facing the faceplate 250 is configured to receive the free ends 288 of the liquid jets 286, and promote the radial compression of the plasma 290 into a high-density pinched plasma 292 column that is generally centered on the central axis 222.

In a z-pinch device 108 configured as a z-pinch engine 110 for pulsed fusion propulsion (e.g., FIGS. 14-16), the cathode plate 268 may include a central opening 270 centered on the central axis 222 to allow the pinched plasma 292 to pass (e.g., eject) into a magnetic nozzle 112 within which the plasma 294 may expand and be expelled from the nozzle 114 to generate thrust 296. The injection system 150 advantageously enables pulsed fusion propulsion involving repeating cycles of: (1) injecting a cylindrical array of liquid jets 286 into an injection area 252 (e.g., a fusion chamber 274), (2) applying an electric current 278 pulse to heat and radially compress the liquid jets 286 into a plasma 290, (3) ejecting the radially-compressed or pinched plasma 292 from the injection area 252 into a nozzle 114, and (4) expanding the plasma 294 within the nozzle 114 and expelling the plasma 294 from the nozzle 114 to generate a pulse of propulsive thrust 296.

The example z-pinch device 108 into which the injection system 150 is implemented may optionally include the enclosure element 272 which extends between the cathode plate 268 to the faceplate 250. In one example, the enclosure element 272 may hold the cathode plate 268 in position relative to the faceplate 250. Alternatively, the enclosure element 272 may be omitted, and the cathode plate 268 may be held in position by a shroud (not shown) or other cathode-supporting element (not shown) as mentioned above. However, for examples that include an enclosure element 272, the faceplate 250, the cathode plate 268, and the enclosure element 272 collectively define a fusion chamber 274 that enclose the liquid jets 286. The fusion chamber 274 may optionally contain a vacuum or an inert gas such as argon or nitrogen to promote z-pinch reactions. In some examples, the inert gas may be at a pressure that is higher than ambient pressure.

The components of the injection system 150 including the reservoir 152, the gating plate 216, the faceplate 250, and the planetary gear system 224, may be formed of a high-temperature, high-strength material such as a metallic material, a polymeric material, a ceramic material, or any combination thereof. In one embodiment, one or more of the above-referenced components may be formed of a high-strength, high-temperature metallic material such as stainless steel, inconel, titanium, or other metallic compositions or alloys that are compatible with the contents (e.g., molten metal) of the reservoir 152 and/or compatible with the byproducts of a z-pinch reaction (e.g., plasma 290) for examples where the injection system is implemented in a z-pinch device 108.

Referring to FIGS. 6-8, the injection system 150 includes the controller 248 which is communicatively coupled to the motor 242 and is configured to control the motor 242 in a manner to rotate the gating plate 216 into an aligned clocking orientation 264 (see FIG. 7) in which the gating plate apertures 218 and the faceplate orifices 256 are aligned, thereby allowing the flow of liquid 158 for initiating the formation of a cylindrical array of liquid jets 286, as shown in FIG. 10. In addition, the controller 248 is configured to control the motor 242 in a manner to rotate the gating plate 216 into a non-aligned clocking orientation 266 (FIG. 8) to block the flow of liquid 158 through the faceplate orifices 256 and thereby terminate the formation of the cylindrical array of liquid jets 286. In some examples, the controller may control the motor 242 in a manner to rotate the gating plate 216 from the non-aligned clocking orientation 266 (FIG. 8) into the aligned clocking orientation 264, and maintain the gating plate 216 in the aligned clocking orientation 264 for a predetermined period of time to allow the injection of a cylindrical array of liquid jets 286 before rotating the gating plate 216 back into the non-aligned clocking orientation 266 to terminate the formation of the liquid jets 286.

In examples where the injection system 150 is implemented in a z-pinch device 108 having a cathode plate 268, the controller 248 may command the motor 242 to rotate the gating plate 216 from the aligned clocking orientation 264 (FIG. 7) to the non-aligned clocking orientation 266 (FIG. 8) at the instant when the free ends 288 of the liquid jets 286 contact the cathode plate 268 and form multiple electrically conductive paths between the faceplate 250 (e.g., the anode) and the cathode plate 268, and prior to the application of the pulse of electric current 278 to the faceplate 250. In the non-aligned clocking orientation 266, the gating plate apertures 218 are non-aligned with the faceplate orifices 256 such that liquid 158 from the reservoir 152 is blocked by the gating plate 216. In this manner, the gating plate 216 terminates the flow of liquid jets 286 out of the faceplate orifices 256, and thereby avoids quenching the z-pinch reaction.

Referring to FIG. 11, the injection system 150 may be implemented in a z-pinch device 108 (e.g., a z-pinch engine 110) having a power source 276. The power source 276 may be configured to store or provide electric charges on the order of mega-amperes such as up to 20 mega-amperes or more. The power source 276 may be electrically coupled to the faceplate 250 and may be configured to discharge a pulse of high-magnitude electric current 278 into the faceplate 250 at the instant when the flow of liquid jets 286 is terminated due to rotation of the gating plate 216 into the non-aligned clocking orientation 266 (FIG. 8). In examples where the z-pinch device 108 has a cathode plate 268, the formation of liquid jets 286 may be terminated when the free ends 288 of the liquid jets 286 make contact with the cathode plate 268, resulting in a cylindrical array of liquid jets 286, each forming an electrically conductive path between the faceplate 250 and the cathode plate 268.

Referring to FIG. 13, as described in greater detail below, the pulse of high-magnitude electric current 278 sets off the z-pinch reaction which occurs over a relatively short time period on the order of hundreds of nanoseconds. During the z-pinch reaction, the electric current 278 pulse travels along each one of the liquid jets 286 in the cylindrical array from the faceplate 250 toward the cathode plate 268, causing the liquid jets 286 to become plasma 290. The electric current pulse 278 flowing through the liquid jets simultaneously generates a magnetic flux 282 that interacts with the electric current 278 to produce a Lorentz force 284. The Lorentz force 284 radially compresses the plasma 290 into a high-temperature (millions of degrees K) pinched plasma 292 column or mass generally centered along the central axis 222 (e.g., the z-axis).

In some examples, the power source 276 may be configured to apply the pulse of electric current 278 to the faceplate 250 at a frequency of at least 1 Hz. The controller 248 may be configured to actuate the motor 242 in synchronization with the discharge of electric current 278 from the power source 276. In this regard, the controller 248 may command the motor 242 to periodically rotate the gating plate 216 between the aligned clocking orientation (FIG. 7) and the non-aligned clocking orientation (FIG. 8), and the power source 276 may apply the pulse of electric current 278 to the faceplate 250 at each instance when the formation of liquid jets 286 is terminated due to rotation of the gating plate 216 from the aligned clocking orientation 264 to the non-aligned clocking orientation 266. The power source 276 may be configured to periodically apply pulses of high-magnitude electric current 278 (e.g., from 1-20 mA or more) each time a new cylindrical array of liquid jets 286 is injected into the fusion chamber 274.

In an embodiment, the controller 248 may command the motor 242 to rotate the gating plate 216 into the aligned clocking orientation 264 at a frequency in the range of 1-10 Hz for successively forming cylindrical arrays of liquid jets 286. However, the motor 242 may be commanded to rotate the gating plate 216 at frequencies of less than 1 Hz. For example, the gating plate 216 may be rotated in a manner to form a new cylindrical array of liquid jets 286 every several hours. In other examples, the gating plate 216 may be rotated in a manner to form a new cylindrical array of liquid jets 286 at frequencies of greater than 10 Hz. The gating plate 216 may be rotated in the same direction on a pulsed basis, resulting in the initiation (e.g., FIG. 10) of a new cylindrical array of liquid jets 286 each time the gating plate apertures 218 become aligned with the faceplate orifices 256 in the aligned clocking orientation 264 shown in FIG. 7, and terminating the formation of each new cylindrical array of liquid jets 286 once the free ends 288 contact the cathode plate 268 (e.g., FIG. 11) and the gating plate 216 is rotated into the non-aligned clocking orientation 266 shown in FIG. 8. Alternatively, the gating plate 216 may be rotated in one direction into the aligned clocking orientation 264, and may be rotated in an opposite direction into the non-aligned clocking orientation 266 to respectively initiate and terminate the formation of each new cylindrical array of liquid jets 286.

Figure 9:
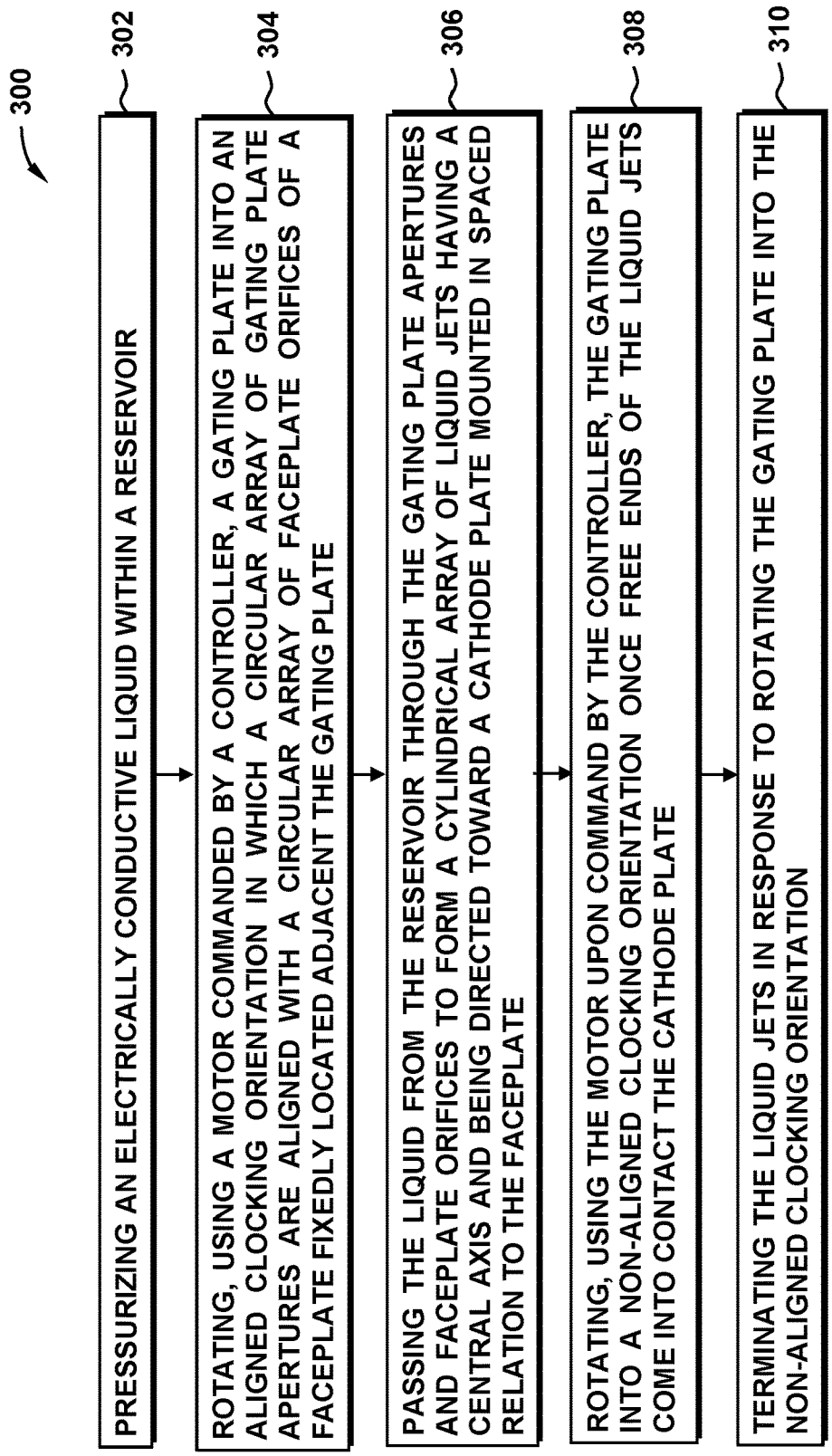
FIG. 9 is a flow chart having one or more operations included in a method of injecting a cylindrical array of liquid jets for a z-pinch device

Referring to the flowchart of FIG. 9 with additional reference to FIGS. 10-16, shown in FIG. 9 are one or more operations included in a method 300 of injecting a cylindrical array of liquid jets 286.

Step 302 of the method 300 includes pressurizing an electrically conductive liquid 158 (FIG. 6) within the reservoir 152. As indicated above, the liquid 158 may be provided as any one a variety of electrically-conductive materials including, but not limited to, water, deuterium, lithium, gallium, indium, bismuth, lead, copper, aluminum, and/or mercury. The method 300 may include applying pressure to the liquid 158 in the reservoir 152 using a piston 168 (FIG. 6) slidably mounted within the reservoir 152. The piston 168 may apply pressure to the liquid 158 at a predetermined pressure level such that the liquid jets 286 are discharged (FIG. 10) from the faceplate orifices 256 as coherent streams. The method 300 may include sealing the piston 168 to the reservoir 152 using the above-described piston seals 172 (FIG. 6) extending around the circumference of the piston side surface 170. In embodiments where the liquid 158 is molten metal, the method may include applying heat to the reservoir 152 using a reservoir heater 160 (FIG. 6) to maintain the molten metal in a molten state. The application of heat may be performed using a resistive heating element such as a Kapton strip heater mounted to the reservoir sidewall 154, or another type of reservoir heater 160.

The method 300 may additionally include monitoring the temperature of the liquid 158 within the reservoir 152 to allow the controller 248 to control the reservoir heater 160 in a manner maintaining the liquid 158 in a molten state. In this regard, the injection system 150 may include the above-described temperature detectors 162 (e.g., thermocouples) mounted to the reservoir 152 and communicatively coupled to the controller 248. The method may include adjusting, under command of the controller 248, the heat output of the reservoir heater 160 if the temperature of the molten metal falls below a threshold temperature (e.g., more than 5 degrees above the melting point of the metal).

Step 304 of the method 300 includes rotating, using a motor 242 under command of the controller 248, the gating plate 216 into the aligned clocking orientation 264 (FIG. 7) in which the circular array 220 of gating plate apertures 218 are aligned with the circular array 258 of faceplate orifices 256. As indicated above, the faceplate 250 is fixedly located immediately adjacent to (e.g., below) the rotatable gating plate 216. The motor 242 may be a stepper motor, a linear actuator, a hydraulic actuator, or any other device capable of rotating the gating plate 216 into discrete angular positions including the aligned clocking orientation 264 (FIG. 8) and the non-aligned clocking orientation 266 (FIG. 8).

The method 300 may further include rotating the gating plate 216 using a planetary gear system 224 having planetary gears 226 angularly spaced around the perimeter of the gating plate 216 and captured between the reservoir base flange 166 and the faceplate 250. Rotation of the gating plate 216 may be performed by rotatably driving at least one of the planetary gears 226 (e.g., the drive gear 230—FIGS. 6-7) to cause rotation of the gating plate 216. The method may additionally include rotatably supporting the gating plate 216 using a gating plate bearing 236 located between the gating plate 216 and the faceplate 250, and preferably using an additional gating plate bearing 236 located between the gating plate 216 and the reservoir base flange 166 as shown in FIGS. 6-7. In the example shown, each one of the gating plate bearings 236 may comprise a plurality of bearing elements 238 such as ball bearings captured within circular grooves 240. The method may additionally include sealing the gating plate 216 to the faceplate 250 and the reservoir base flange 166 using one or more gating plate seals 234 as shown in FIGS. 6-7. The gating plate seals 234 may be configured as circumferential seals such as O-rings located between the gating plate 216 and the reservoir base flange 166, and between the gating plate 216 and the faceplate 250.

Step 306 of the method 300 includes passing liquid 158 from the reservoir 152 through the gating plate apertures 218 and faceplate orifices 256 to form a cylindrical array of liquid jets 286 directed toward the cathode plate 268 (FIGS. 9-10). As indicated above, the liquid 158 may be under pressure within the reservoir 152 to force the liquid 158 through the gating plate apertures 218 and faceplate orifices 256 when the gating plate 216 is in the aligned clocking orientation 264 (FIG. 7). The gating plate 216 and faceplate 250 may include the same quantity of respective gating plate apertures 218 and faceplate orifices 256 to generate a corresponding quantity of liquid jets 286. In some examples, the faceplate 250 may include an orifice liner 260 in each one of the faceplate orifices 256. As mentioned above, the orifice liners 260 may be formed of a high-hardness, high-temperature-resistant material to reduce or prevent erosion of the faceplate orifices 256 over time as the liquid 158 flows through the faceplate orifices 256. In addition, the faceplate orifices 256 may be configured to promote formation of the liquid jets 286 as coherent streams which, in examples where the injection system 150 is implemented in a z-pinch device 108, advantageously promotes uniform distribution of the electric current 278 pulse among the liquid jets 286.

Step 308 of the method 300 includes rotating, using the motor 242 upon command by the controller 248, the gating plate 216 from the aligned clocking orientation 264 to the non-aligned clocking orientation 266. For example, the motor 242 may rotate the gating plate 216 into the non-aligned clocking orientation 266 after the elapse of a predetermined amount of time during which a discrete quantity of liquid jets 286 is injected into an injection area 252. In examples where the injection system 150 is implemented in a z-pinch device 108, the motor 242 may rotate the gating plate 216 into the non-aligned clocking orientation 266 when the free ends 288 of the liquid jets 286 contact the cathode plate 268 of the z-pinch device 108 as shown in FIG. 11. Toward this end, the z-pinch device 108 may include one or more sensors (not shown) that may sense when the free ends 288 of the liquid jets 286 contact the cathode plate 268. The sensors may send a signal to the controller 248 causing the controller 248 to rotate the gating plate 216 into the non-aligned clocking orientation 266.

Step 310 of the method 300 includes terminating the formation of the liquid jets 286 jets in response to rotating the gating plate 216 into the non-aligned clocking orientation 266. FIG. 8 shows the gating plate apertures 218 non-aligned with the faceplate orifices 256 such that liquid 158 from the reservoir 152 is blocked or prevented from flowing into the faceplate orifices 256. In a z-pinch device 108, blocking the additional flow of liquid jets 286 into the faceplate orifices 256 avoids quenching a z-pinch reaction that is initiated when the liquid jets 286 establish a conductive path between the faceplate 250 and the cathode plate 268.

For a z-pinch device 108, the method 300 may include applying, using the power source 276, a pulse of electric current 278 to the faceplate 250 (e.g., the anode) when the formation of the liquid jets 286 is terminated. The pulse of electric current 278 may be applied to the faceplate 250 at the same time (e.g., within microseconds or nanoseconds) as when the free ends 288 of the liquid jets 286 contact the cathode plate 268 and the gating plate 216 is rotated into the non-aligned clocking orientation 266. In some examples, the method may include commanding, using a power source regulator (not shown), the power source 276 to apply the pulse of electric current 278 to the faceplate 250 at a frequency of at least 1 Hz. The controller 248 may command the motor 242 to periodically rotate the gating plate 216 between the aligned clocking orientation 264 and the non-aligned clocking orientation 266, and the power source 276 may apply the pulse of electric current 278 to the faceplate 250 at the point in time when formation of a cylindrical array of liquid jets 286 is terminated. In some examples, the method may include rotating the gating plate 216 into the aligned clocking orientation 264 at a frequency in the range of 1-10 Hz.

For examples where the injection system 150 is implemented in a z-pinch device 108, the method 300 may include returning at least a portion of the electric current 278 back to the power source 276 to at least partially assist in recharging the power source 276. The method 300 may optionally include performing a z-pinch reaction within a vacuum formed in a fusion chamber 274. Alternatively, the fusion chamber 274 may include a gas such as argon or nitrogen to facilitate the z-pinch reaction.

Figure 12:
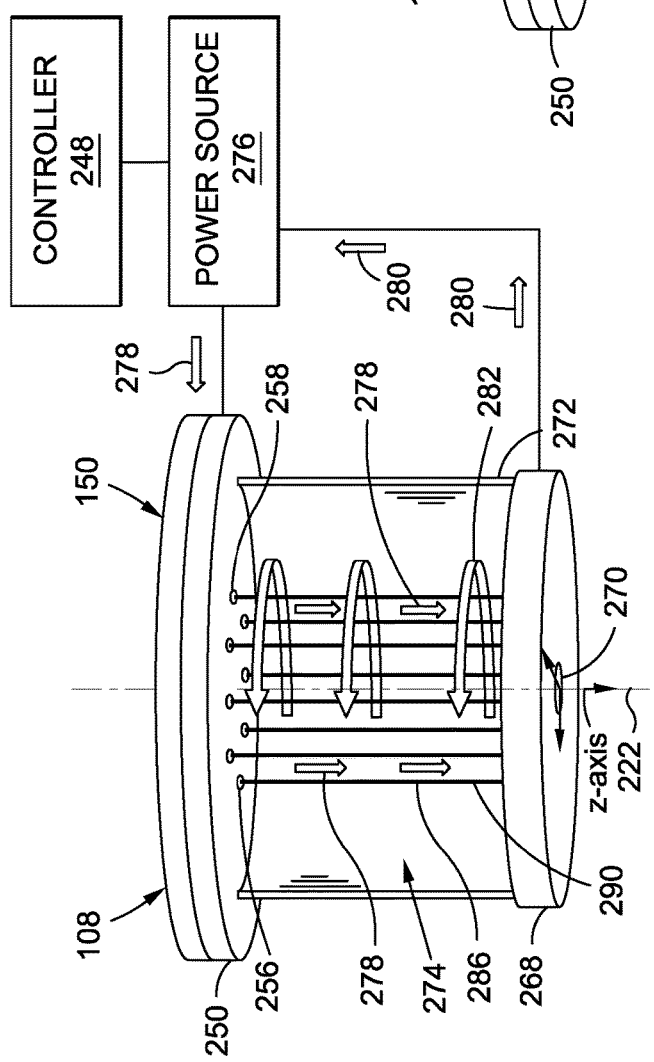
FIG. 12 is a perspective view of the injection system of FIG. 10 showing an electric current pulse applied by a power source or power source bank to the faceplate (e.g., the anode) and showing the electric current flowing along each one of the liquid jets from the faceplate toward the cathode plate causing the liquid jets to become plasma.

In some examples, the method 300 may include heating the liquid jets 286 into hot plasma 290 using the electric current 278 pulse flowing along the length of the liquid jets 286. FIG. 12 illustrates the initial stages of heating the liquid jets 286 in a z-pinch device 108 as the electric current 278 flows through the liquid jets 286, resulting in the transformation of each one of the liquid jets 286 into plasma 290 core. The flow of electric current 278 along the liquid jets 286 also generates a magnetic flux 282 surrounding the array of plasma 290 cores, as shown in FIGS. 12-13. The magnetic flux 282 interacts with the electric current 278 resulting in a Lorentz force 284 as shown in FIG. 13. The Lorentz force 284 compresses the plasma 290 cores radially inwardly toward the central axis 222, resulting in a pinched plasma 292 cylinder of very high temperature (e.g., on the order of 1 million degrees K) and very high density (e.g., $10^{20}$ ions/cm$^3$). The total elapsed time for the z-pinch reaction starting from the application of the electric current 278 pulse until stagnation of the imploded plasma 292 at the central axis 222 is on the order of less than 1 microsecond.

The above-described steps of rotating the gating plate 216 into the aligned clocking orientation 264 (Step 304), passing liquid 158 through the faceplate orifices 256 to initiate injection of the cylindrical array of liquid jets 286 (Step 306), rotating the gating plate 216 into the non-aligned clocking orientation 266 (Step 308), and terminating the formation of the liquid jets 286 (Step 310) may be summarized as injecting a cylindrical array of liquid jets 286 into an injection area 252. In some examples, the method 300 may include injecting a cylindrical array of liquid jets 286 on a repeating basis. For example, the method 300 may include sequentially performing the steps of: injecting a cylindrical array of liquid jets 286 into the injection area 252, applying, using the power source 276, a pulse of electric current 278 to the faceplate 250, heating, using an electric current 278 pulse, the liquid jets 286 into a plasma 290, and ejecting the plasma 290 from the injection area 252. The passage of the electric current 278 pulse along the liquid jets 286 results in the above-mentioned Lorentz force 284 which radially compresses the plasma 290 into a high-temperature pinched plasma 292 cylinder which may be ejected from the injection area 252 through a central opening 270 in the cathode plate 268. As mentioned above, the ability to repeatedly inject a cylindrical array of electrically-conductive liquid jets 286 into an injection area 252 such as a fusion chamber 274 may facilitate or improve the ability to perform z-pinch experiments. In addition, the ability to repeatedly inject a cylindrical array of electrically-conductive liquid jets 286 may allow for generating a continuing sequence of fusion propulsion pulses of thrust 296 such as for propelling a vehicle 100, or for performing any one of a variety of other activities that require repeating arrays of electrically-conductive liquid jets 286. In this regard, the presently-disclosed injection system 150 and method 300 advantageously avoids the time and expense associated with installing new metallic wires (not shown) each time a z-pinch reaction is to be performed.

FIGS. 14-16 illustrate the implementation of the injection system 150 in a z-pinch engine 110 wherein the method 300 may include using the high-temperature and high-density plasma 290 at the central axis 222 to generate fusion propulsion for a vehicle 100. FIG. 14 illustrates a pinched plasma 292 cylinder passing through the central opening 270 in the cathode plate 268 and into the magnetic nozzle 112 mounted to the aft side of the cathode plate 268. As described above, the magnetic nozzle 112 generates magnetic field lines 118 (FIG. 14) which prevent the high-temperature plasma 290 from contacting and potentially damaging the nozzle rings 114. FIG. 15 illustrates the expanding plasma 294 inside the magnetic nozzle 112, resulting in compression of the magnetic field which, in turn, gradually increases the strength and magnetic pressure of the magnetic field. The increasing magnetic pressure of the magnetic field from the expanding plasma 294 is reacted by radial and axial forces on the nozzle rings 114 of the magnetic nozzle 112, resulting in a pulse of propulsive thrust 296 (FIG. 16) directed along the main axis (not shown) of the vehicle 100. The magnetic pressure from the expanding plasma 294 pushes the plasma 294 toward the aft end (e.g., the open end) of the nozzle 112, ultimately resulting in expulsion of the plasma from the nozzle 112, after which the magnetic field decompresses back to its original state (FIG. 14). Pulsed fusion propulsion occurs during the expansion and expulsion of the plasma 294 from the nozzle 114.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. An injection system, comprising:
   a reservoir for containing an electrically conductive liquid under pressure, the reservoir having a reservoir end;

a gating plate located at the reservoir end and having a circular array of gating plate apertures and being rotatable about a central axis passing through a center of the gating plate circular array;

a faceplate fixedly positioned adjacent to the gating plate and having a circular array of faceplate orifices arranged complementary to the gating plate apertures;

a motor configured to rotate the gating plate about the central axis;

a controller configured to control the motor to:

rotate the gating plate into an aligned clocking orientation in which the gating plate apertures and the faceplate orifices are aligned to initiate injection of a cylindrical array of liquid jets into an injection area; and rotate the gating plate into a non-aligned clocking orientation of the gating plate apertures relative to the faceplate orifices to terminate formation of the liquid jets after a discrete quantity of the liquid is injected.

2. The injection system of claim 1, further comprising a planetary gear system including:

at least three planetary gears angularly spaced around the gating plate; and the motor configured to rotatably drive at least one of the planetary gears for rotating the gating plate.

3. The injection system of claim 1, wherein:

at least one of the faceplate orifices includes an orifice lining formed of at least one of metallic material, ceramic material, and jewel material.

4. The injection system of claim 3, wherein:

the orifice lining has a conically-shaped interior that tapers in size along a direction from a receiving end of the orifice lining to a discharging end of the orifice lining.

5. The injection system of claim 1, wherein:

each one of the faceplate orifices has an opening width of less than approximately 100 microns.

6. The injection system of claim 1, wherein:

the liquid is molten metal; and the reservoir including a reservoir heater configured to maintain the molten metal in a molten state.

7. The injection system of claim 1, further including:

a piston slidably mounted in the reservoir for applying pressure to the liquid.

8. The injection system of claim 1, wherein:

the liquid jets are injected toward a cathode plate located in spaced relation to the faceplate; and the motor is configured to rotate the gating plate into the non-aligned clocking orientation to terminate formation of the liquid jets when free ends of the liquid jets contact the cathode plate.

9. The injection system of claim 1, wherein:

the injection area is a fusion chamber collectively defined by an enclosure element extending between the faceplate and a cathode plate located in spaced relation to the faceplate.

10. A z-pinch device, comprising:

an injection system, including:

a reservoir for containing an electrically conductive liquid under pressure, the reservoir having a reservoir end;

a gating plate located at the reservoir end and having a circular array of gating plate apertures and being rotatable about a central axis passing through a center of the gating plate circular array;

a faceplate fixedly positioned adjacent to the gating plate and having a circular array of faceplate orifices complementary to the gating plate apertures;

a motor configured to rotate the gating plate about the central axis;

a controller configured to control the motor to:

rotate the gating plate into an aligned clocking orientation in which the gating plate apertures and the faceplate orifices are aligned to initiate injection of a cylindrical array of liquid jets toward a cathode plate;

rotate the gating plate into a non-aligned clocking orientation to terminate formation of the liquid jets after free ends of the liquid jets contact the cathode plate; and a power source configured to apply a pulse of electric current to the faceplate, the electric current flowing through the liquid jets to the cathode plate and transforming the liquid jets into a plasma along the central axis.

11. A method of injecting a cylindrical array of discrete liquid jets, comprising the steps of:

rotating, using a motor commanded by a controller, a gating plate into an aligned clocking orientation in which a circular array of gating plate apertures are aligned with a circular array of faceplate orifices of a faceplate fixedly located adjacent the gating plate;

passing liquid under pressure in a reservoir through the gating plate apertures and faceplate orifices to initiate injection of a cylindrical array of liquid jets into an injection area;

rotating, using the motor commanded by the controller, the gating plate into a non-aligned clocking orientation; and terminating formation of the liquid jets in response to rotating the gating plate into the non-aligned clocking orientation.

12. The method of claim 11, wherein the steps of rotating the gating plate includes:

rotatably driving, using the motor, at least one of at least three planetary gears angularly spaced around a perimeter of the gating plate.

13. The method of claim 11, wherein:

at least one of the faceplate orifices includes an orifice lining formed of at least one of metallic material, ceramic material, and jewel material.

14. The method of claim 11, wherein the liquid is molten metal, the method further including:

applying, using a reservoir heater, heat to the reservoir to maintain the molten metal in a molten state.

15. The method of claim 14, further including:

monitoring, using a temperature detector communicatively coupled to the controller, a temperature of the liquid within the reservoir; and adjusting, under command of the controller, a heat output of the reservoir heater if the temperature of the liquid falls below a threshold temperature.

16. The method of claim 11, further including:

applying pressure to the liquid in the reservoir using a piston slidably mounted within the reservoir.

17. The method of claim 11, further including:

applying, using a power source, a pulse of electric current to the faceplate when the liquid jets are terminated; and heating, using the electric current, the liquid jets into a plasma.

18. The method of claim 17, wherein the steps of rotating the gating plate into the aligned clocking orientation, passing liquid through the faceplate orifices to initiate injection of the cylindrical array of liquid jets, rotating the gating plate into the non-aligned clocking orientation, and terminating formation of the liquid jets comprise injecting a cylindrical array of liquid jets into the injection area, the method comprising sequentially performing the following steps on a repeating basis:

injecting a cylindrical array of liquid jets into the injection area;

applying, using the power source, a pulse of electric current to the faceplate;

heating, using the electric current, the liquid jets into a plasma; and ejecting the plasma from the injection area.

19. The method of claim 17, wherein the step of applying the pulse of electric current to the faceplate comprises:

applying the pulse of electric current to the faceplate at a frequency of at least 1 Hz.

20. The method of claim 17, further including:

returning at least a portion of the electric current back to the power source.

21. The method of claim 11, wherein the step of passing liquid through the gating plate apertures and faceplate orifices to form a cylindrical array of liquid jets directed toward a cathode plate comprises:

injecting the liquid jets into a fusion chamber collectively defined by an enclosure element extending between the faceplate and a cathode plate located in spaced relation to the faceplate.

\* \* \* \* \*